(12) United States Patent
Kanaparti et al.

(10) Patent No.: US 7,827,275 B2
(45) Date of Patent: Nov. 2, 2010

(54) METHOD AND SYSTEM FOR REMOTELY ACCESSING DEVICES IN A NETWORK

(75) Inventors: Shrikant Kanaparti, Bangalore (IN); Yu Song, Pleasanton, CA (US); Doreen Cheng, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 241 days.

(21) Appl. No.: 11/810,009

(22) Filed: Jun. 4, 2007

(65) Prior Publication Data

US 2007/0288632 A1      Dec. 13, 2007

Related U.S. Application Data

(60) Provisional application No. 60/812,377, filed on Jun. 8, 2006.

(51) Int. Cl.
*G06F 15/173* (2006.01)

(52) U.S. Cl. .................. 709/224; 709/201; 709/223; 709/226; 709/228; 709/245; 709/246; 709/208; 370/255; 370/389; 370/331; 710/38; 726/3; 726/22; 726/25

(58) Field of Classification Search .......... 709/201, 709/208, 223, 224, 226, 228, 245–246; 370/230, 370/401, 255, 389, 331; 710/38; 726/3, 726/22, 25
See application file for complete search history.

(56) References Cited

U.S. PATENT DOCUMENTS

| | | | |
|---|---|---|---|
| 5,911,143 A | 6/1999 | Deinhart et al. | |
| 6,073,242 A | 6/2000 | Hardy et al. | |
| 6,202,066 B1 | 3/2001 | Barkley et al. | |
| 6,269,405 B1 | 7/2001 | Dutcher et al. | |
| 6,269,406 B1 | 7/2001 | Dutcher et al. | |
| 6,311,205 B1 | 10/2001 | Dutcher et al. | |
| 6,357,010 B1 | 3/2002 | Viets et al. | |

(Continued)

FOREIGN PATENT DOCUMENTS

WO      2004079594      9/2004

(Continued)

OTHER PUBLICATIONS

Notification of Transmittal of the International Search Report and the Written Opinion of the International Searching Authority; PCT/KR2007/002772, dated Sep. 18, 2007.

(Continued)

*Primary Examiner*—Wing F Chan
*Assistant Examiner*—Hitesh Patel
(74) *Attorney, Agent, or Firm*—Kenneth L. Sherman, Esq.; Michael Zarrabian, Esq.; Myers Andras Sherman LLP

(57) ABSTRACT

A method and system for remote access to a device is provided. This involves establishing a connection between a local device connected in a local network and a remote device via a communication link; sending a message from the local device to the remote device via the communication link, indicating an online status of the local device; and maintaining an online status indication for the local device at the remote device, until arrival of a message indicating an offline status of the local device.

42 Claims, 4 Drawing Sheets

U.S. PATENT DOCUMENTS

| | | | |
|---|---|---|---|
| 6,434,607 B1 | 8/2002 | Haverstock et al. | |
| 6,442,695 B1 | 8/2002 | Dutcher et al. | |
| 6,453,353 B1 | 9/2002 | Win et al. | |
| 6,574,736 B1 | 6/2003 | Andrews et al. | |
| 6,640,307 B2 | 10/2003 | Viets et al. | |
| 6,651,096 B1 | 11/2003 | Gai et al. | |
| 6,654,794 B1 | 11/2003 | French | |
| 6,665,303 B1 | 12/2003 | Saito et al. | |
| 6,948,076 B2 | 9/2005 | Saito et al. | |
| 6,970,127 B2 | 11/2005 | Rakib et al. | |
| 7,081,830 B2 | 7/2006 | Shimba et al. | |
| 7,225,263 B1 | 5/2007 | Clymer et al. | |
| 7,316,027 B2 | 1/2008 | Burch et al. | |
| 7,380,271 B2 | 5/2008 | Moran et al. | |
| 7,421,740 B2 | 9/2008 | Fey et al. | |
| 7,424,475 B2 | 9/2008 | Ishii et al. | |
| 7,437,755 B2 | 10/2008 | Farino et al. | |
| 7,478,094 B2 | 1/2009 | Ho et al. | |
| 7,536,709 B2 | 5/2009 | Shitano | |
| 7,657,748 B2 | 2/2010 | Gentry | |
| 2001/0033554 A1 | 10/2001 | Ayyagari | 370/328 |
| 2002/0078161 A1* | 6/2002 | Cheng | 709/208 |
| 2002/0103850 A1 | 8/2002 | Moyer | 709/202 |
| 2002/0112045 A1 | 8/2002 | Nirkhe et al. | |
| 2003/0163701 A1 | 8/2003 | Ochi et al. | |
| 2004/0059924 A1 | 3/2004 | Soto et al. | |
| 2004/0125402 A1 | 7/2004 | Kanai et al. | |
| 2004/0205172 A1* | 10/2004 | Kim | 709/222 |
| 2004/0242209 A1 | 12/2004 | Kruis et al. | |
| 2004/0249768 A1 | 12/2004 | Kontio et al. | |
| 2005/0066024 A1* | 3/2005 | Crocitti et al. | 709/223 |
| 2005/0099982 A1* | 5/2005 | Sohn et al. | 370/338 |
| 2005/0108556 A1 | 5/2005 | DeMello et al. | |
| 2005/0122934 A1* | 6/2005 | Fujita | 370/328 |
| 2005/0125696 A1* | 6/2005 | Afshar et al. | 713/201 |
| 2005/0144481 A1 | 6/2005 | Hopen et al. | |
| 2006/0080534 A1 | 4/2006 | Yeap et al. | |
| 2006/0143295 A1 | 6/2006 | Costa-Requena et al. | |
| 2006/0153072 A1* | 7/2006 | Bushmitch et al. | 370/230 |
| 2006/0184530 A1 | 8/2006 | Song et al. | |
| 2006/0185004 A1 | 8/2006 | Song et al. | |
| 2006/0195893 A1 | 8/2006 | Caceres et al. | |
| 2006/0230130 A1* | 10/2006 | Cho et al. | 709/223 |
| 2007/0022479 A1 | 1/2007 | Sikdar et al. | |
| 2007/0214241 A1* | 9/2007 | Song et al. | 709/219 |
| 2007/0214356 A1 | 9/2007 | Song et al. | |
| 2007/0288487 A1 | 12/2007 | Song et al. | |
| 2008/0294559 A1* | 11/2008 | Wield et al. | 705/50 |

OTHER PUBLICATIONS

Quiang Wang et al.; An inter-application and inter-client priority-based QoS proxy architecture for heterogeneous networks; Proceedings, 10$^{th}$ IEEE Symposium on Computer and Communications ISCC 2005. Jun. 27-30, 2005, pp. 819-824.

Jeong, J. et al., "A XML-Based Single Sign-on Scheme Supporting Mobile and Home Network Service Environments," IEEE Transactions on Consumer Electronics, Nov. 2004, pp. 1081-1086, vol. 50, No. 4, IEEE Service Center, New York, NY.

Arnold, J. et al., "Single Sign On-Funktionalitat in desentralen Umgebungen," IP.com Journal, Jul. 23, 2003, p. 97, West Henrietta, NY.

Jeong, J. et al., "An XML-Based Single Sign-on Scheme Supporting OSGi Framework," Consumer Electronics, 2005, pp. 31-32, Digest of Technical Papers.

SyncML—Sync Protocol, Version 1.0, www.syncml.org/docs/syncml_protocol_v10_20001207.pdf, pp. 1-60, Dec. 7, 2000.

Open Digital Rights Language (ODRL) Version 1.1, W3C Note, www.w3.org/TR/2002/NOTE-odrl-20020919, Sep. 19, 2002.

Notification of Transmittal of the International Search Report and the Written Opinion of the International Searching Authority; PCT/KR2007/002766, dated Sep. 12, 2007.

Greenwald, S.J. et al., "A New Security Policy for Distributed Resource Management and Access Control," ACM Special Interest Group on Security, Audit, and Control, 1996, pp. 74-86, ACM, New York, NY.

U.S. Non-Final Office Action for U.S. Appl. No. 11/056,221 mailed Dec. 8, 2008.

U.S. Final Office Action for U.S. Appl. No. 11/056,221 mailed May 12, 2009.

U.S. Non-Final Office Action for the U.S. Appl. No. 11/809,016 mailed Jun. 25, 2009.

U.S. Non-Final Office Action for U.S. Appl. No. 11/056,221 mailed Oct. 9, 2009.

U.S. Non-Final Office Action for U.S. Appl. No. 11/809,016 mailed Jan. 4, 2010.

U.S. Final Office Action for U.S. Appl. No. 11/056,221 mailed May 11, 2010.

U.S. Non-Final Office Action for U.S. Appl. No. 11/809,016 mailed Jul. 13, 2010.

U.S. Non-Final Office Action for U.S. Appl. No. 11/713,522 mailed Apr. 27, 2010.

* cited by examiner

METHOD AND SYSTEM FOR REMOTELY ACCESSING DEVICES IN A NETWORK

RELATED APPLICATION

This application claims priority from U.S. Provisional Patent Application Ser. No. 60/812,377, filed Jun. 8, 2006, incorporated herein by reference.

FIELD OF THE INVENTION

The present invention relates to remote access to devices in a network, and in particular to remote access to Universal Plug and Play (UPnP) devices.

BACKGROUND OF THE INVENTION

The UPnP standard has increased its importance in becoming a standard for home networking. UPnP is designed to be used in private networks. An example of a private network is a Local Area Network (LAN), such as a home network including networked electronics devices, and has no consideration for accessing devices in a home network remotely, e.g., over the Internet or from another home network.

The Simple Service Discovery Protocol (SSDP) forms the foundation of the UPnP standard. One aspect of the SSDP involves a service discovery request. A UPnP Control Point in a UPnP network multicasts requests to check for any online UPnP Devices. Each UPnP Device must listen for such requests, and when it receives such a request, the UPnP Device sends a unicast response back to the requesting UPnP Control Point. On the other hand, a UPnP Device also periodically advertises itself by multicasting its presence. When a UPnP Control Point receives such advertisement, it can consider that the UPnP Device is online and is ready to be used. As the number of Devices/Services increase, the number of advertisements increases.

This periodic multicasting is not scalable for remote access where Device/Service advertisement must travel over a connecting network (e.g., the Internet) between a home network and a Remote Control Point. This is because the bandwidth available for communication through the Internet is typically much less than that available in a home network. Applying existing UPnP SSDP over the Internet results in increasing consumption of limited bandwidth for the SSDP traffic and thus wasting valuable resources, such as the limited Internet connection bandwidth. Moreover, communication latency over the Internet is difficult to control. Long latencies can cause the Control Point to mistakenly treat a remote UPnP Device as offline, and cause errors in applications. There is, therefore, a need for a method and system for remote access to devices, which addresses the above shortcomings.

BRIEF SUMMARY OF THE INVENTION

The present invention provides a method and system for remote access to a device in a network. In one embodiment, this involves establishing a connection between a local device connected in a local network and a remote device via a communication link; sending a message from the local device to the remote device via the communication link, indicating an online status of the local device; and maintaining an online status indication for the local device at the remote device, until arrival of a message indicating an offline status of the local device. The remote device maintains (considers) the local device in the network, until the remote device receives an offline message from the local device. Latency in communication over the communication link such as the Internet does not result in the remote device considering the local device offline until the remote device receives an offline message in relation to the local device.

An example implementation for a UPnP Device involves establishing a connection between a UPnP Device connected in a local network and a remote device including a Control Point, via a communication link; sending a message from the UPnP Device to the Remote Control Point via the communication link, indicating an online status of the UPnP Device; and maintaining an online status indication for the UPnP Device at the Control Point, until arrival of a message indicating an offline status of the UPnP Device.

The Remote Control Point maintains the UPnP Device in the network, until the Control Point receives an offline message from the UPnP Device. Latency in communication over the communication link such as the Internet does not result in the Remote Control Point considering the UPnP Device offline until the Remote Control Point receives an offline message in relation to the UPnP Device.

The present invention may enable optimization of the UPnP SSDP traffic between a UPnP Device in a network and a Remote Control Point, over the Internet. It also may enable optimization of the UPnP SSDP traffic between a UPnP Control Point in a first network and another UPnP Device in another network over the Internet. These features are further backward compatible with existing UPnP SSDP architectures.

These and other features, aspects and advantages of the present invention will become understood with reference to the following description, appended claims and accompanying figures.

DETAILED DESCRIPTION OF THE INVENTION

Figure 1:
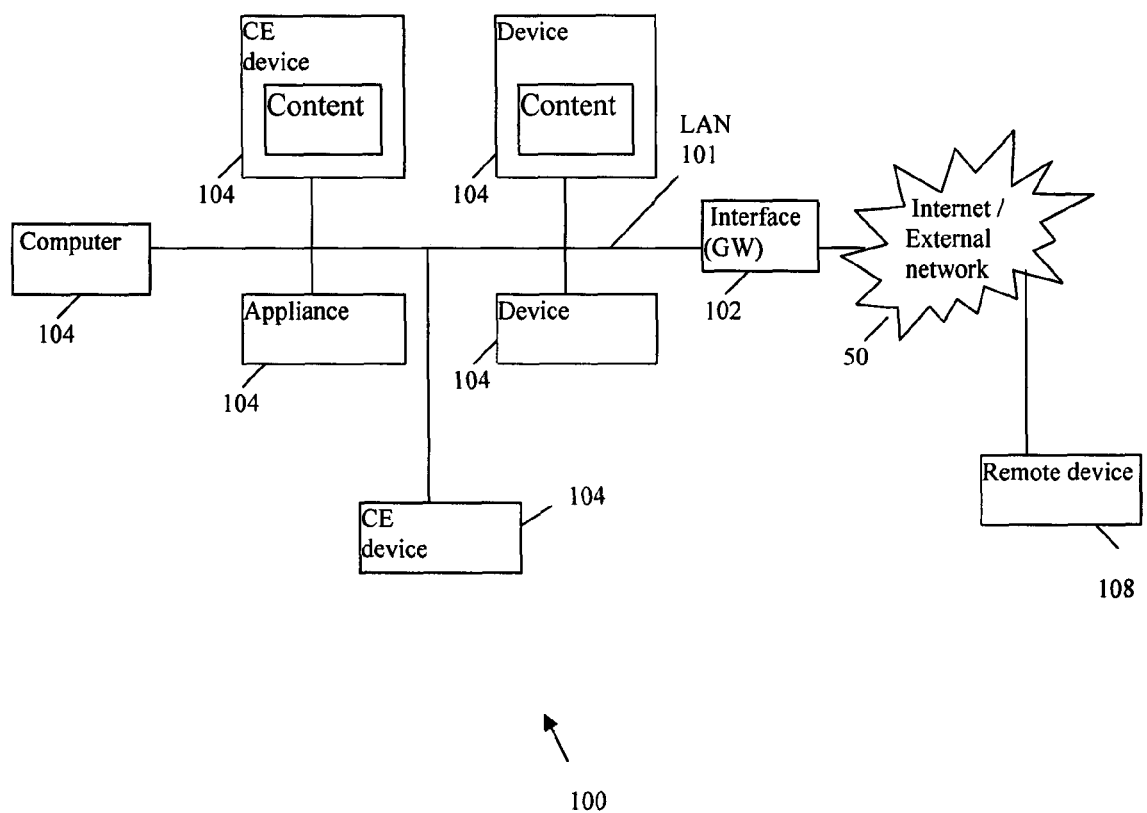
FIG. 1 shows a functional block diagram of an example network implementing UPnP remote access, according to an embodiment of the present invention.

The present invention provides a method and system for remote access to a local device in a local network, such as a UPnP Device in a local network. In one embodiment, this involves establishing a connection between a local device connected in a local network and a remote device via a communication link; sending a message from the local device to the remote device via the communication link, indicating an online status of the local device; and maintaining an online status indication for the local device at the remote device, until arrival of a message indicating an offline status of the local device. The remote device maintains (considers) the local device in the network, until the remote device receives an offline message from the local device. Latency in communication over the communication link such as the Internet does not result in the remote device considering the local device offline until the remote device receives an offline message in relation to the local device.

An example implementation for remote access by a Remote Control Point in a remote device, to a UPnP Device in a local network, is now described. Such an implementation involves establishing a connection between a UPnP Device connected in a local network and a remote device including a Control Point, via a communication link; sending a message from the UPnP Device to the Remote Control Point via the communication link, indicating an online status of the UPnP Device; and maintaining an online status indication for the UPnP Device at the Control Point, until arrival of a message indicating an offline status of the UPnP Device.

The Internet enables devices to be connected virtually anywhere and at anytime. Utilizing the Internet and UPnP, according to an embodiment of the present invention, LAN (e.g., the home network) users can access content in devices in the LAN, control devices and services in home from anywhere and at anytime, etc. For example, parents can access a home surveillance camera to monitor their kids at home while working. The present invention provides a process that optimizes the device and service discovery protocol used in the current UPnP architecture, for remote access to UPnP Devices/Services by a Control Point over the Internet.

The philosophy behind the existing UPnP SSDP architecture is for a Control Point to treat a UPnP Device/Service as offline if the Control Point does not receive SSDP alive messages from the UPnP Device/Service within a specified period. This requires that each Device/Service to periodically multicast its presence within the network. Though such a multicasting process may work when the Control Point is within the same LAN as the UPnP Devices/Services. Such a process breaks down when network devices are accessed remotely through the Internet where latency is typically long and often violates the UPnP SSDP specification for correct operations. As such, the present invention provides a process that optimizes the SSDP traffic for UPnP Device/Service discovery over the Internet between a UPnP Device in a LAN, and a Control Point in a remote device. This involves the Remote Control Point maintaining the information regarding the UPnP Device in the network, until the Remote Control Point receives an offline ("byebye") message from the UPnP Device. As a result, latency in communication over the Internet does not cause the Remote Control Point to consider the UPnP Device as offline until the Control Point receives an offline message in relation to the UPnP Device. An example implementation of the present invention is described below.

FIG. 1 shows a functional architecture of an example network 100 such as a home network, embodying aspects of the present invention. The network 100 comprises devices 104 which can include consumer electronics (CE) devices (e.g., TV, VCR, PDA, STB, cell phone), appliances, etc. Some of the devices 104 may include content (e.g., audio/visual content), while others may not. The network 100 further includes an interface, such as a gateway (GW) 102 that connects the network 100 to an external network 50 (e.g., another local network, the Internet). Though the devices 104 are shown separately, a single physical device can include one or more logical devices. One or more devices in the network 100 implement the UPnP protocol. The devices 104 and the gateway 102 are connected by a LAN 101. FIG. 1 also shows a remote access device 108, such as a standalone CE device, or a device in a network, etc., for accessing one or more devices 104 via the external network 50.

Figure 2:
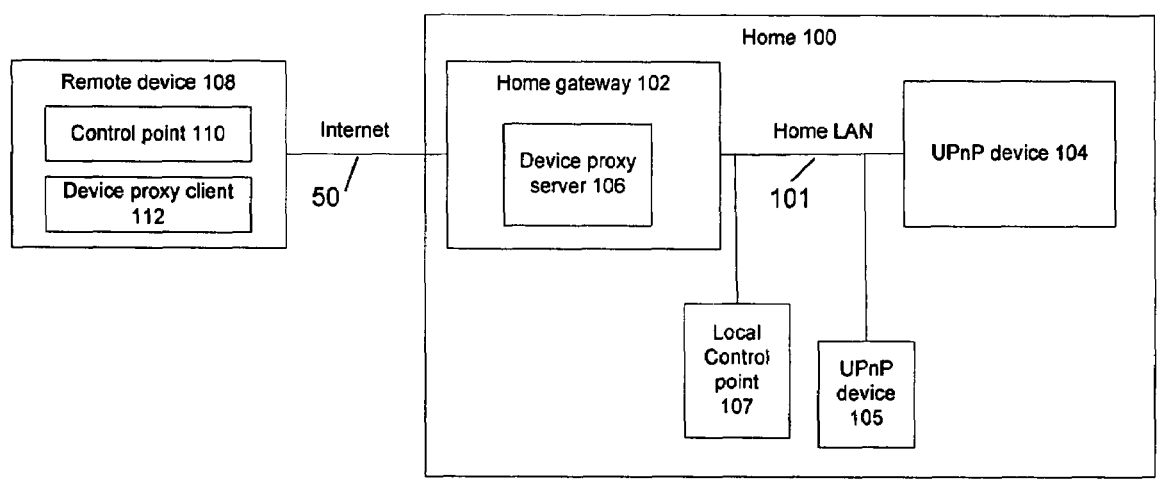
FIG. 2 shows a functional block diagram of a UPnP Device in a network communicating with a remote device via the Internet, according to an embodiment of the present invention.

FIG. 2 shows a more detailed view of the remote device 108 accessing a UPnP Device 104 in the network 100 via the Internet and the home gateway 102. A UPnP Device 104 and the home gateway 102 are connected by a home LAN 101 (other devices are also connected to the LAN 101 as shown in FIG. 1). The home gateway 102 preferably includes a device proxy server 106 for intercepting and processing SSDP messages between the network 100 and the Internet 50. The remote device 108 includes a UPnP Control Point 110 and a device proxy client 112. The device proxy client 112 cooperates with the device proxy server 106 to regulate the SSDP traffic. The proxy client 112 processes SSDP traffic between the UPnP client device 104 and the Control Point 110. As such, from the point of view of the Control Point 110, SSDP messages appear to originate from the proxy client 112 instead of the UPnP Device 104. The network 100 can include one or more additional UPnP Device 105 and a Local Control Point 107.

Figure 3:
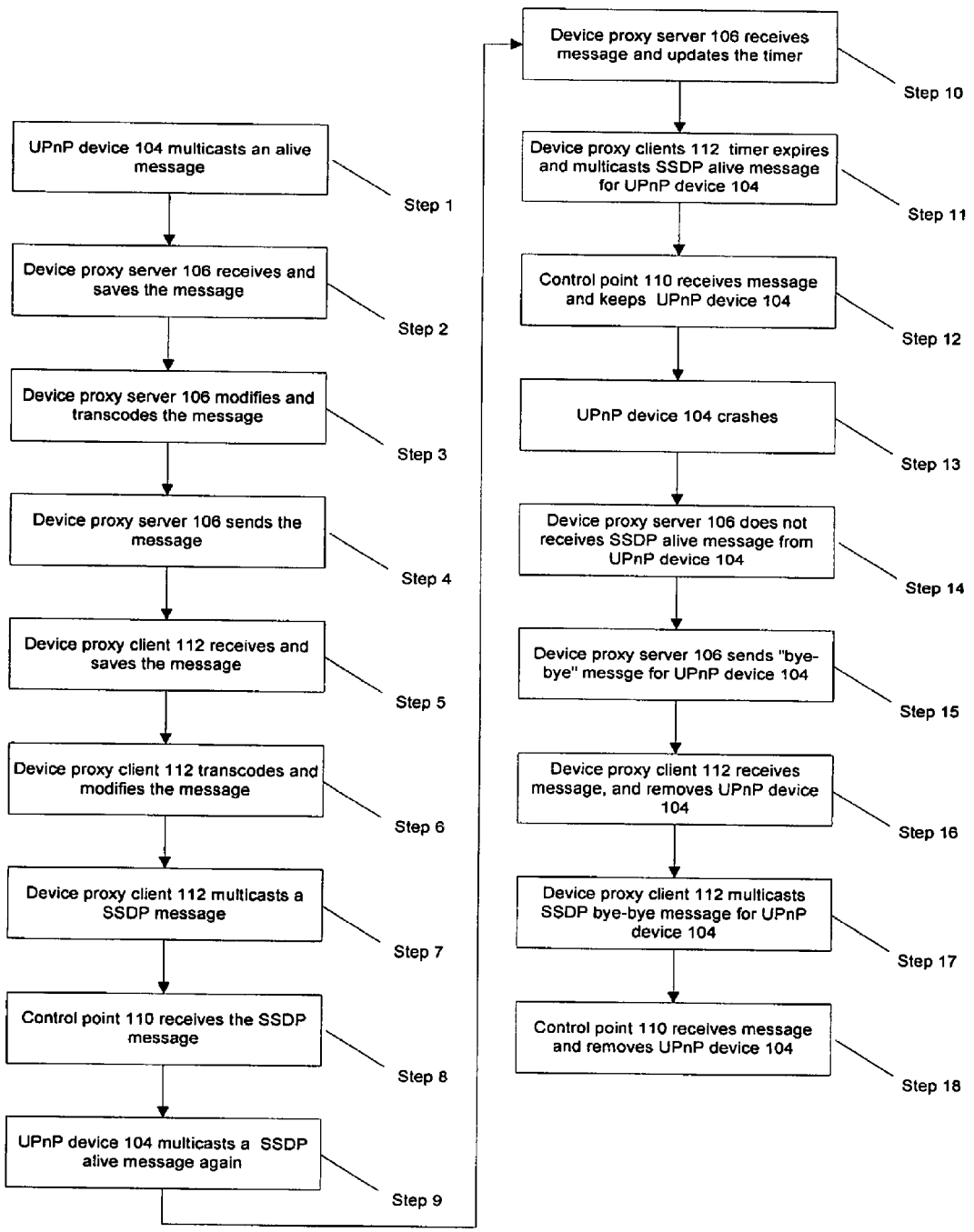
FIG. 3 shows a flowchart of a process for UPnP remote access in FIG. 2, according to an embodiment of the present invention.

FIG. 3 shows an example communication process 60 implemented between the UPnP Device 104 and the remote UPnP Device 108, according to an embodiment of the present invention, including the steps of:

1. The UPnP Device 104 sends (multicasts) a SSDP alive message over the LAN to advertise itself and all of the services it contains.
2. The device proxy server 106 in the home gateway 102 receives the message, saves the message and sets a first timer for expiration of the SSDP message. The first timer is set according to a max-age header in the SSDP alive message specification.
3. The device proxy server 106 transcodes the SSDP message into a format that is used for communication between the device proxy server 106 and the device proxy client 112. The device proxy server 106 also modifies a SSDP LOCATION header such that a URL therein points to the device proxy server 106 in the gateway 102 instead of the actual UPnP Device 104.
4. The device proxy server 106 sends the transcoded and modified message to the device proxy client 112 of the remote device 108 via the Internet.
5. The device proxy client 112 saves the message and sets a second timer in the device proxy client 112 for the expiration of the message according to a max-age header in the SSDP alive message specification.
6. The device proxy client 112 transcodes the message into a UPnP SSDP message. In addition, the device proxy client 112 modifies the SSDP LOCATION header such that a URL therein points to the device proxy client 112 instead of the device proxy server 106 in the gateway 102.
7. The device proxy client 112 then multicasts the SSDP message within the network that the remote device 108 belongs to. In this embodiment, the device proxy client 112 multicasts the SSDP message on the loopback network (i.e., IP address of 127.0.0.1) of the device 104, that the Control Point 110 is listening on.
8. The Control Point 110 receives the SSDP message from the proxy client 112 from the loopback network and further obtains the Device/Service description of the device 104 via the URL in the LOCATION header of the SSDP message. When the Control Point obtains the description, request and response messages are then passed between the Control Point 110 and the UPnP Device 104 via the device proxy client 112 and the device proxy server 106.
9. At a later time, before the SSDP message expires, the UPnP Device 104 multicasts another round of SSDP messages in the network to inform other devices, including the Control Point 110 that the UPnP Device 104 is still online.

10. The device proxy server 106 receives the SSDP messages indicating an online status of the UPnP Device 104, and updates the first timer in the device proxy server 106 with a new expiration time.
11. When the second timer expires on the device proxy client 112, if the device proxy client 112 determines that it has not received an offline ("byebye") message from the device proxy server 106, the device proxy client 112 multicasts a new round of SSDP alive message on behalf of the UPnP Device 104; and resets the second timer with an expiration time copied from the expiration time of the previous second timer in the proxy client 112.
12. The Control Point 110 receives the new round of SSDP messages from the device proxy client 112, and considers the UPnP Device 104 as still online.
13. At a later time, the UPnP Device 104 goes offline, for example, a home user turns it off, power outage, etc.
14. When the first timer expires on the device proxy server 106, if the device proxy server 106 determines that it has not received a new SSDP alive message from the UPnP Device 104, the device proxy server 106 considers the UPnP Device 104 as offline and removes the UPnP Device 104 from its memory.
15. The device proxy server 106 sends a "byebye" message to the device proxy 112, indicating an offline status of the UPnP Device 104.
16. The device proxy client 112 receives the offline message from the device proxy server 106.
17. The device proxy client 112 multicasts a SSDP offline message on behalf of the device proxy server 106 which represents the UPnP Device 104, and removes the UPnP Device 104 from its memory.
18. The Control Point 110 receives the offline message and removes the device proxy client 112, which represents the UPnP Device 104 from its online device list.

As such, the Remote Control Point 110 maintains the UPnP Device 104 in the network, until the Control Point 110 receives a SSDP message that indicates the UPnP Device 104 if offline. In other words, the Control Point considers the UPnP Device as remaining online until the Control Point receives a SSDP message indicating that the UPnP Device is offline. Therefore, latency in communication over the Internet does not result in the Remote Control Point removing the UPnP Device from the network prematurely that results in inconsistency of UPnP Device actual status and perceived UPnP Device status by the Remote Control Point. Accordingly, the present invention optimizes the SSDP traffic for UPnP Device/Service discovery over the Internet between a UPnP Device in a LAN and a Control Point in a Remote Device. As an option, the LAN can agree upon sending a periodic message to the remote device indicating the presence of Devices in the LAN, interval being configurable.

An alternative embodiment involves implementing the device proxy client 112 on a second gateway in anther home network, wherein the remote device 108 connects to the second gateway. All operations remain the same, as described above.

The present invention provides a method and system for optimizing the UPnP discovery process for remote access to UPnP Devices. The present invention enables optimization of the UPnP SSDP traffic between a remote UPnP Device on the Internet and a UPnP Device in a LAN. The present invention also enables optimization of the UPnP SSDP traffic between a UPnP Control Point in a first network and another UPnP Device in another network, over the Internet. These features are further backward compatible with existing UPnP SSDP architectures.

Figure 4:
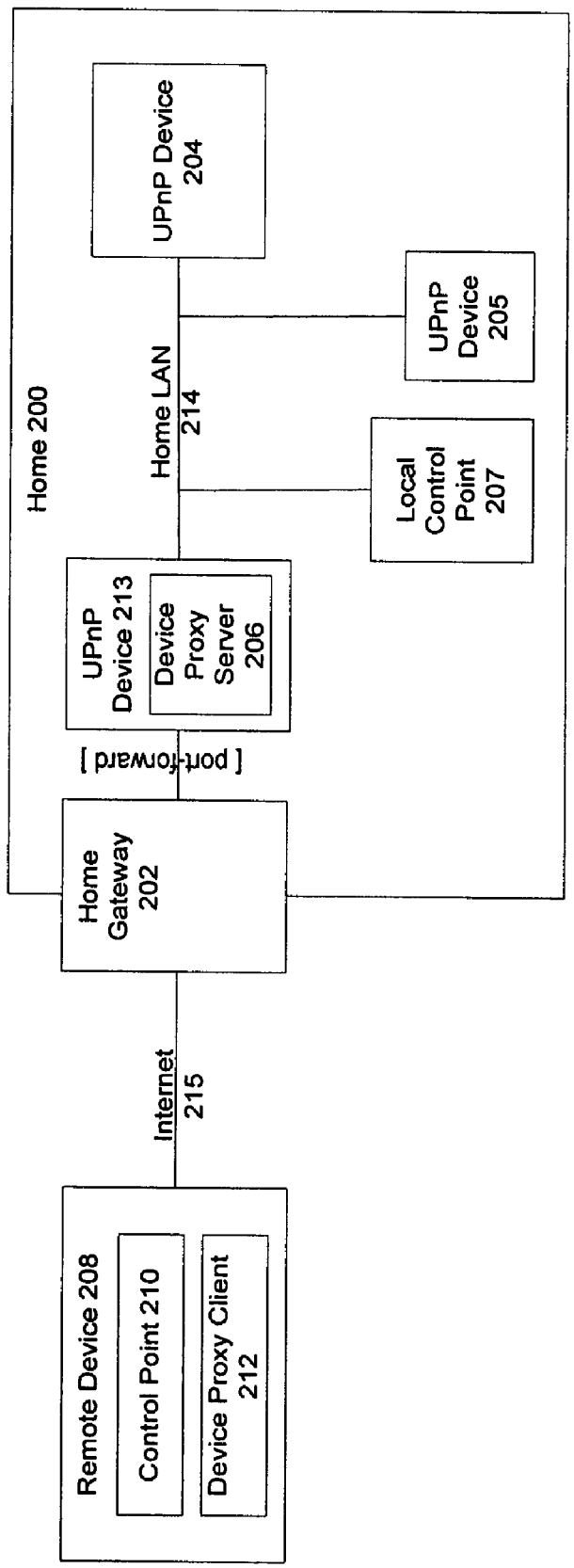
FIG. 4 shows a functional block diagram of a UPnP Device in a network communicating with a remote device via the Internet, according to another embodiment of the present invention.

Referring to FIG. 4, in another example according to the present invention, the proxy server can be implemented in as a separate entity, having a port-forwarding mechanism from the LAN gateway for all traffic it receives from external sources. In FIG. 4 a remote device 208 accesses a UPnP Device 204 in a network 200 via the Internet 215, a home gateway 202 and a UPnP device 213 which implements a device proxy server 206. The UPnP Device 204 and the UPnP device 213 are connected by the LAN 214, and the gateway 202 is connected to the UPnP Device 213 (other devices 205, 207 are also connected to the LAN as shown in FIG. 1). The device proxy server 206 is configured for intercepting and processing SSDP messages between the network 200 and the Internet 215 (similar to the device proxy server 106 in FIG. 2). The remote device 208 includes a UPnP Control Point 210 and a device proxy client 212 (similar to the remote device 108 in FIG. 2). The device proxy client 212 cooperates with the device proxy server 206 to regulate the SSDP traffic. The proxy client 212 processes SSDP traffic between the UPnP client device 204 and the Control Point 210. As such, from the point of view of the Control Point 110, SSDP messages appear to originate from the proxy client 212 instead of the UPnP Device 204. The proxy server 206 is implemented in the LAN 214 as a separate entity in the UPnP device 213, having a port-forwarding mechanism from the home gateway 202 for all traffic it receives. The process 60 in FIG. 3 is applicable to the example in FIG. 4, with a change to the step 4 such that the device proxy server 206 forwards the message to the Home Gateway 202 to send to the remote device 208.

Though in the above description examples for the UPnP standard are provided, as those skilled in the art will recognize the present invention is useful with any communication protocol that uses discovery/eventing/messaging protocols.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for remote access to a device, comprising:

establishing a connection between a remote device and a local device on a local network, via a communication link;

providing gateway in the local network;

providing a proxy server for interfacing between the local device and the gateway; while the gateway in turn connects to the remote device over the communication link; and providing a proxy client in the remote device, the proxy client interfacing between the Control Point and the proxy server over the communication link;

the remote device receiving and saving a multicast simple service discovery protocol (SSDP) alive message from the local device indicating an online status of the local device, wherein the local device and the remote device are Universal Plug and Play (UPnP) devices;

the proxy server:

setting a first timer for expiration of the SSDP alive message from the local device;

transcoding the SSDP alive message to a format used for communication between the proxy server and the proxy client that is mutually understood by the proxy server and a proxy client;

modifying the transcoded SSDP alive message to indicate the proxy server as the originator of the SSDP message; and sending the modified transcoded SSDP alive message to the proxy client over the communication link; and maintaining an online status indication for the local device without sending further messages, until arrival of an SSDP byebye message indicating an offline status of the local device.

2. The method of claim 1 wherein:

the remote device includes a Control Point;

establishing a connection includes establishing a connection between the remote device and the local device via the communication link;

sending the SSDP alive message includes sending the SSDP alive message from the local device to the remote Control Point via the communication link, indicating an online status of the local device; and maintaining an online status indication includes maintaining an online status indication for the local device at the Control Point, until arrival of the SSDP byebye message indicating an offline status of the local device.

3. The method of claim 2 wherein:

sending the SSDP alive message from the local device to the remote Control Point includes the local device multicasting the SSDP alive message over the local network, indicating an online status of the local device; and maintaining an online status indication for the local device at the Control Point includes maintaining an online status indication for the local device at the Control Point, until the arrival of the SSDP byebye message indicating an offline status of the local device.

4. The method of claim 3 wherein maintaining an online status indication for the local device at the Control Point includes considering the local device as remaining online until the arrival of the SSDP byebye message indicating an offline status of the local device.

5. The method of claim 3 wherein the communication link comprises an external network.

6. The method of claim 3 wherein the communication link comprises the Internet and the remote device is external to the local network.

7. The method of claim 3 further comprising:

providing a gateway in the local network, the gateway including the proxy server interfacing between the local device and the remote device over the communication link; and providing the proxy client in the remote device, the proxy client interfacing between the Control Point and the proxy server over the communication link.

8. The method of claim 3 wherein:

multicasting the SSDP alive message from the local device on the local network indicating an online status of the local device;

the proxy client receiving and saving the modified transcoded SSDP alive message, and setting a second timer for expiration of the SSDP alive message;

the proxy client transcoding the modified transcoded SSDP alive message into a UPnP formatted SSDP alive message;

the proxy client modifying the UPnP formatted SSDP alive message to indicate the proxy client as the originator of the UPnP formatted SSDP alive message;

the proxy client sending the UPnP formatted SSDP alive message to the remote Control Point; and the remote Control Point receiving the UPnP formatted SSDP alive message from the proxy client.

9. The method of claim 8 further comprising:

the proxy client multicasting the UPnP formatted SSDP alive message into the LAN where the remote Control Point belongs.

10. The method of claim 8 further comprising:

the Control Point and the local device communicating via the proxy client and the proxy server over the communication link.

11. The method of claim 8 wherein maintaining an online status indication for the local device at the remote Control Point, until arrival of the SSDP byebye message indicating an offline status of the local device, further includes:

before expiration of the first timer on the proxy server, the local device multicasting a further SSDP alive message indicating an online status of the local device;

the proxy server receiving the further SSDP alive message, and updating the first timer for expiration of the further SSDP alive message;

upon expiration of said second timer on the proxy client, if the proxy client has not received a device offline message from the proxy server indicating an offline status of the-local device, the proxy client multicasting a further SSDP alive message indicating an online status of the local device; and the remote Control Point receiving the further SSDP alive message multicast from the proxy client, and maintaining an online status indication for the local device at the remote Control Point.

12. The method of claim 8 wherein maintaining an online status indication for the local device at the remote Control Point, until arrival of the SSDP byebye message indicating an offline status of the local device, further includes:

the local device goes offline;

upon expiration of the first timer on the proxy server, if the proxy server has not received a further SSDP alive message indicating an online status of the local device, the proxy server considering the local device as offline, and sending a device offline message to the proxy client indicating an offline status of the local device via the communication link;

the proxy client receiving the device offline message from the proxy server, and the proxy client multicasting the SSDP byebye message to the remote Control Point, indicating an offline status of the local device; and the remote Control Point receiving the SSDP byebye message from the proxy client indicating an offline status of the local device, and considers the local device as offline.

13. A system for remote access by a remote device to a local device in a local network via a communication link, comprising:

a proxy module for the local network, configured for performing message forwarding in the network, wherein the proxy module sends a message on behalf of the local device to the remote device via the communication link, indicating an online status of the local device, wherein the message forwarding including:

the remote device receiving and saving a multicast simple service discovery protocol (SSDP) alive message from the local device indicating an online status of the local device, wherein the local device and the remote device are Universal Plug and Play (UPnP) devices;

the proxy module including a proxy server configured for interfacing between the local device and a gateway; while the gateway in turn connects to the remote device over the communication link, the proxy module including a proxy client configured for between a Control Point and the proxy module over the communication link;

setting a first timer for expiration of the SSDP alive message from the local device;

transcoding the SSDP alive message to a format used for communication between a proxy server and a proxy client that is mutually understood by the proxy server and the proxy client;

modifying the transcoded SSDP alive message to indicate the proxy server as the originator of the SSDP alive message; and the proxy module sending the modified transcoded SSDP alive message to the proxy client over the communication link and a proxy control for the remote device configured for receiving the modified transcoded SSDP message from the proxy module and maintaining an online status indication for the local device without sending further messages, until receiving an SSDP byebye message from the proxy module indicating an offline status of the local device.

14. The system of claim 13 wherein:

the remote device includes the remote Control Point;

the proxy module is further configured for performing message forwarding at a UPnP layer in the network, wherein the proxy module sends the SSDP alive message on behalf of the local device to the remote Control Point via the communication link, indicating an online status of the local device; and the proxy control is further configured for receiving the SSDP alive message from the proxy module and maintaining an online status indication for the local device at the remote Control Point, until receiving the SSDP byebye message from the proxy module indicating an offline status of the local device.

15. The system of claim 14 wherein the proxy control is further configured for maintaining an online status indication for the local device at the Control Point by considering the local device as remaining online until communication of the SSDP byebye message indicating an offline status of the local device.

16. The system of claim 14 wherein the communication link comprises an external network.

17. The system of claim 15 wherein the communication link comprises the Internet.

18. The system of claim 14 wherein:

the proxy client is further configured for: receiving and saving the modified transcoded SSDP alive message; setting a second timer for expiration of the received modified transcoded SSDP alive message; transcoding the modified transcoded SSDP alive message into a UPnP formatted SSDP alive message;

modifying the UPnP formatted SSDP alive message to indicate the proxy client as the originator of the UPnP formatted SSDP alive message; and sending the UPnP formatted SSDP alive message to the remote Control Point; and the remote Control Point is further configured for receiving the UPnP formatted SSDP alive message from the proxy client.

19. The system claim 18 wherein the proxy client is further configured for multicasting the SSDP alive message into the remote Control Point.

20. The system of claim 18 wherein the Control Point and the local device communicate via the proxy client and the proxy server over the communication link.

21. The system of claim 18 wherein the proxy client is further configured for maintaining an online status indication for the local device at the remote Control Point, until arrival of the SSDP byebye message indicating an offline status of the local device, wherein before expiration of the first timer on the proxy server, the local device multicasts a further SSDP alive message indicating an online status of the local device, and the proxy server is configured for receiving the further SSDP alive message, and updating the first timer for expiration of the further SSDP message;

such that, upon expiration of said second timer on the proxy client, if the proxy client has not received the SSDP byebye message from the proxy server indicating an offline status of the local device, the proxy client multicasts a further SSDP alive message indicating an online status of the local device; and the remote Control Point receives the further SSDP alive message multicast from the proxy client, and maintains an online status indication for the local device at the remote Control Point.

22. The system of claim 18 wherein:

the proxy server is further configured such that when the local device goes offline, upon expiration of the first timer on the proxy server, if the proxy server has not received a further SSDP alive message indicating an online status of the local device, the proxy server considers the local device as offline, and sends the SSDP byebye message to the proxy client indicating an offline status of the local device via the communication link;

the proxy client is further configured for receiving the SSDP byebye message from the proxy server, and multicasting the SSDP byebye message to the remote Control Point, indicating an offline status of the local device; and the remote Control Point is configured for receiving the SSDP byebye message from the proxy client indicating an offline status of the local device, to consider the local device as offline.

23. An apparatus for remote access by a remote device to a local device in a local network via a communication link, comprising:

a gateway for the local network, wherein the gateway is configured for performing message forwarding in the network;

the gateway comprising a proxy module including a proxy server, the proxy module configured for:

interfacing the local device and the gateway in the network, while the gateway in turn connects to a proxy client over the communication link;

sending a multicast simple service discovery protocol (SSDP) alive message on behalf of the local device to the remote device via the communication link, the SSDP alive message indicating an online status of the local device without sending further messages until communication of an SSDP byebye message indicating an offline status of the local device, wherein the local device and the remote device are Universal Plug and Play (UPnP) devices;

the remote device configured for:
receiving and saving the SSDP alive message from the local device via the gateway indicating the online status of the local device;
setting a first timer for expiration of the SSDP alive message from the local device;
transcoding the SSDP alive message to a format used for communication between the proxy server and the proxy client that is mutually understood by the proxy server and the proxy client;
modifying the transcoded SSDP alive message to indicate the proxy server as the originator of the SSDP alive message; and
the remote device sending the modified transcoded SSDP alive message to the proxy client over the communication link.

24. The apparatus of claim 23 wherein: the remote device includes a remote Control Point;
the gateway is further configured for performing message forwarding at a UPnP layer in the network; and
the proxy module is further configured for sending the SSDP alive message on behalf of the local device to the remote Control Point via the communication link, indicating an online status of the local device without sending further messages until communication of the SSDP byebye message indicating an offline status of the local device.

25. The apparatus of claim 24 wherein:
the proxy module is further configured for receiving the SSDP alive message, indicating an online status of the local device, and sending a corresponding message to the Control Point indicating an online status of the local device.

26. The apparatus of claim 25 wherein the communication link comprises an external network.

27. The apparatus of claim 25 wherein the communication link comprises the Internet.

28. The apparatus of claim 25 wherein:
the proxy module includes a proxy server configured for interfacing between the local device and the proxy client for the remote Control Point over the communication link.

29. The apparatus of claim 25 wherein:
the proxy server is further configured for: receiving and saving the multicast SSDP alive message from the local device; setting the first timer for expiration of the SSDP alive message; modifying the SSDP alive message to indicate the proxy server as the originator of the SSDP alive message; transcoding the SSDP alive message to a format that is mutually understood by the proxy server and the proxy client; and sending the transcoded SSDP alive message to the proxy client over the communication link.

30. The apparatus of claim 29 wherein:
the proxy server is further configured such that when the local device goes offline, upon expiration of the first timer on the proxy server, if the proxy server has not received a further SSDP alive message indicating an online status of the local device, the proxy server considers the local device as offline, and sends the SSDP byebye message to the proxy client indicating an offline status of the local device via the communication link, whereby the remote Control Point considers the local device as offline.

31. An apparatus for remote access by a remote device to a local device in a local network via a communication link, comprising:

a proxy control for the remote device configured for
receiving and saving a multicast simple service discovery protocol (SSDP) alive message from the local device indicating an online status of the local device, wherein the local device and the remote device are Universal Plug and Play (UPnP) devices;
a proxy module including a proxy server, the proxy module configured for:
interfacing between the local device and a gateway; while the gateway in turn connects to the remote device over the communication link; and
a proxy client in the remote device interfacing between the Control Point and the proxy server over the communication link;
setting a first timer for expiration of the SSDP alive message from the local device;
modifying the SSDP alive message to indicate the proxy module as the originator of the SSDP alive message;
transcoding the SSDP alive message to a format used for communication between the proxy module and the proxy control that is mutually understood by the proxy module and the proxy control;
the proxy control further configured for:
receiving the modified transcoded SSDP message from the proxy module;
and
maintaining an online status indication for the local device without receiving further messages, until receiving a SSDP byebye message from the proxy module indicating an offline status of the local device.

32. The apparatus of claim 31 wherein: the remote device includes a remote Control Point;
the proxy control is further configured for receiving the first message from the proxy module in the local network indicating an online status of the local device, and maintaining an online status indication for the local device at the remote Control Point without receiving further messages, until receiving the SSDP byebye message from the proxy module indicating an offline status of the local device.

33. The apparatus of claim 32 wherein:
the proxy control is further configured for maintaining an online status indication for the local device at the remote Control Point, until communication of the SSDP byebye message indicating an offline status of the local device.

34. The apparatus of claim 33 wherein the proxy control is further configured for maintaining an online status indication for the local device at the remote Control Point by considering the local device as remaining online until communication of the SSDP byebye message indicating an offline status of the local device.

35. The apparatus of claim 33 wherein the communication link comprises an external network.

36. The apparatus of claim 33 wherein the communication link comprises the Internet.

37. The apparatus of claim 32 wherein:
the proxy client is further configured for: receiving and saving SSDP alive message from the proxy module; setting a second timer for expiration of the SSDP alive message; transcoding the SSDP alive message into a UPnP SSDP alive message format; modifying the UPnP formatted SSDP alive message to indicate the proxy client as the originator of the UPnP formatted SSDP alive message; and sending the modified SSDP alive message to the remote Control Point; and the remote Control Point is further configured for receiving the SSDP alive message from the proxy client.

38. The apparatus of claim 37 wherein the proxy client is further configured for multicasting the SSDP alive message into the remote Control Point.

39. The apparatus of claim 37 wherein the proxy client is further configured for maintaining an online status indication for the local device at the remote Control Point, until arrival of the SSDP byebye message indicating an offline status of the local device, wherein before expiration of the first timer on the proxy module, the local device multicasts a further SSDP alive message indicating an online status of the local device;
   such that, upon expiration of said second timer on the proxy client, if the proxy client has not received the SSDP byebye message from the proxy module indicating an offline status of the local device, the proxy client multicasts a further SSDP alive message indicating an online status of the local device; and
   the remote Control Point receives the further SSDP alive message multicast from the proxy client, and maintains an online status indication for the local device at the remote Control Point.

40. The apparatus of claim 37 wherein:
   the proxy client is further configured for receiving the SSDP byebye message from the proxy module and multicasting the SSDP byebye message to the remote Control Point, indicating an offline status of the local device; and
   the remote Control Point is configured for receiving the SSDP byebye message from the proxy client indicating an offline status of the local device, to consider the local device as offline.

41. An apparatus for remote access by a remote device to a local device in a local network via a communication link, comprising:
   a gateway for the local network, wherein the gateway is configured for performing message forwarding in the network; and
   the gateway comprising a proxy module including a proxy server, the proxy module configured for sending a message on behalf of the local device to the remote device via the communication link, indicating an online status of the local device until communication of another message indicating an offline status of the local device, where the local device comprises a Universal Plug and Play (UPnP) Device, and the remote device includes a Remote Control Point;
      the gateway is further configured for performing message forwarding at a UPnP layer in the network; and
   the proxy module is further configured for sending a message on behalf of the UPnP Device to the Remote Control Point via the communication link, indicating an online status of the UPnP Device until communication of another message indicating an offline status of the UPnP Device, and for receiving a SSDP message, indicating an online status of the UPnP Device, and sending a corresponding message to the Control Point indicating an online status of the UPnP Device; and
   the proxy server is further configured for: receiving and saving a multicast SSDP alive message from the UPnP Device; setting a first timer for expiration of the SSDP message; modifying the SSDP alive message to indicate the proxy server as the originator of the SSDP message; transcoding the SSDP alive message to a device online message format that is mutually understood by the proxy server and the proxy client; and sending the device online message to the proxy client over the communication link.

42. A method for remote access to a device, comprising the steps of:
   establishing a connection between a remote device and a local device on a local network, via a communication link, wherein the local device and the remote device are Universal Plug and Play (UPnP) devices;
   providing a gateway in the local network, the gateway including a proxy server interfacing between the local and the remote device over the communication link;
   providing a proxy client in the remote device, the proxy client interfacing between a Control Point of the remote device and the proxy server over the communication link;
   the gateway sending a multicast simple service discovery protocol (SSDP) alive message on behalf of the local device to the remote device via the communication link, the SSDP alive message indicating an online status of the local device;
   receiving and saving the SSDP alive message by the remote device from the local device via the gateway indicating the online status of the local device;
   the proxy server:
      setting a first timer for expiration of the SSDP alive message from the local device;
      transcoding the SSDP alive message to a format used for communication between the proxy server and the proxy client that is mutually understood by the proxy server and the proxy client;
      modifying the transcoded SSDP alive message to indicate the proxy server as the originator of the SSDP alive message; and
      sending the modified transcoded SSDP alive message by the remote device to the proxy client over the communication link; and
      maintaining an online status indication for the local device without sending further messages, until arrival of a SSDP byebye message indicating an offline status of the local device.

* * * * *